United States Patent
Khan

(10) Patent No.: US 9,760,943 B2
(45) Date of Patent: Sep. 12, 2017

(54) METHODS, SYSTEMS, AND COMPUTER READABLE MEDIA FOR PREPARING AND DELIVERING AN ORDERED PRODUCT UPON DETECTING A CUSTOMER PRESENCE

(75) Inventor: Mohammad Khan, San Jose, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 556 days.

(21) Appl. No.: 13/236,243

(22) Filed: Sep. 19, 2011

(65) Prior Publication Data

US 2012/0072311 A1    Mar. 22, 2012

Related U.S. Application Data

(60) Provisional application No. 61/384,013, filed on Sep. 17, 2010.

(51) Int. Cl.
  *G06Q 30/00*   (2012.01)
  *G06Q 30/06*   (2012.01)
  (Continued)

(52) U.S. Cl.
  CPC ......... *G06Q 30/0641* (2013.01); *G06Q 30/02* (2013.01); *G06Q 30/06* (2013.01);
  (Continued)

(58) Field of Classification Search
  CPC .............. G06Q 30/02; G06Q 30/0267; G06Q 30/0255; G06Q 20/40; G06Q 20/20;
  (Continued)

(56) References Cited

U.S. PATENT DOCUMENTS 6,435,406 B1 *   8/2002   Pentel .......................... 235/380
6,505,774 B1     1/2003   Fulcher et al.
(Continued)

FOREIGN PATENT DOCUMENTS

KR   10-2008-002835    1/2008
KR   10-2009-0000735   1/2009
(Continued)

OTHER PUBLICATIONS

"Restaurants aim to boost sales with mobile apps," Lisa Terry, Nation's Restaurant News 43.8: 4(2). Lebhar-Friedman, Inc., Mar. 2, 2009.*

(Continued)

*Primary Examiner* — Anne Georgalas
(74) *Attorney, Agent, or Firm* — Jenkins, Wilson, Taylor & Hunt, P.A.

(57) ABSTRACT

Methods, systems, and computer readable media for preparing and delivering an ordered product upon detecting a customer presence are disclosed. In one example, a method includes detecting the presence of a mobile device associated with a customer identifier at a designated area and initiating, upon detecting the presence of the mobile device, the processing of a stored order request associated with the customer identifier for at least one product. The method further includes utilizing the customer identifier to send a notification message to the mobile device indicating that the at least one product is available for pickup or delivery.

21 Claims, 3 Drawing Sheets

(51) Int. Cl.
  *G06Q 30/02* (2012.01)
  *G06Q 50/12* (2012.01)
(52) U.S. Cl.
  CPC ..... *G06Q 30/0601* (2013.01); *G06Q 30/0609* (2013.01); *G06Q 30/0613* (2013.01); *G06Q 30/0635* (2013.01); *G06Q 50/12* (2013.01)
(58) Field of Classification Search
  CPC .............. G06Q 30/00; G06Q 30/0641; G06Q 30/0609; G06Q 30/0613; G06Q 30/0601; G06Q 30/06; G06Q 30/0635; G06Q 50/12
  USPC ................................................ 705/26.1, 27.1
  See application file for complete search history.

(56) References Cited

U.S. PATENT DOCUMENTS

| | | | |
|---|---|---|---|
| 8,060,413 B2 | 11/2011 | Castell et al. | |
| 8,184,019 B2 | 5/2012 | Chauvin et al. | |
| 8,626,591 B2* | 1/2014 | Ablowitz | G06Q 10/087 235/379 |
| 9,430,786 B2* | 8/2016 | Khan | G06Q 30/06 |
| 9,536,243 B2* | 1/2017 | Khan | G06Q 20/0457 |
| 2002/0032601 A1 | 3/2002 | Admasu et al. | |
| 2002/0095333 A1 | 7/2002 | Jokinen et al. | |
| 2002/0143638 A1* | 10/2002 | August et al. | 705/26 |
| 2003/0050854 A1* | 3/2003 | Showghi | G06Q 10/02 705/15 |
| 2004/0054591 A1 | 3/2004 | Spaeth et al. | |
| 2004/0054592 A1 | 3/2004 | Hernblad | |
| 2004/0158499 A1* | 8/2004 | Dev et al. | 705/26 |
| 2005/0222961 A1 | 10/2005 | Staib et al. | |
| 2006/0218040 A1* | 9/2006 | Sabapathypillai | G06Q 30/06 705/15 |
| 2007/0016479 A1 | 1/2007 | Lauper | |
| 2007/0030824 A1* | 2/2007 | Ribaudo | G01S 5/0018 370/328 |
| 2007/0205278 A1* | 9/2007 | Lovett | 235/383 |
| 2007/0224979 A1 | 9/2007 | O'Neal et al. | |
| 2008/0114884 A1 | 5/2008 | Hewes et al. | |
| 2008/0126261 A1 | 5/2008 | Lovett | |
| 2008/0192932 A1 | 8/2008 | Graeber et al. | |
| 2008/0262929 A1 | 10/2008 | Behr | |
| 2009/0112765 A1 | 4/2009 | Skowronek | |
| 2009/0216606 A1 | 8/2009 | Coffman et al. | |
| 2009/0281903 A1 | 11/2009 | Blatstein | |
| 2010/0070365 A1 | 3/2010 | Siotia et al. | |
| 2011/0082746 A1 | 4/2011 | Rice et al. | |
| 2011/0084804 A1 | 4/2011 | Khorashadi et al. | |
| 2011/0258058 A1* | 10/2011 | Carroll | G06Q 30/06 705/15 |
| 2011/0264490 A1 | 10/2011 | Durvasula et al. | |
| 2011/0276511 A1 | 11/2011 | Rosenberg | |
| 2011/0320243 A1 | 12/2011 | Khan | |
| 2012/0005026 A1 | 1/2012 | Khan et al. | |
| 2012/0059741 A1 | 3/2012 | Khan et al. | |

FOREIGN PATENT DOCUMENTS

| | | |
|---|---|---|
| WO | WO 2006/055721 A2 | 5/2006 |
| WO | WO 2009/158681 A1 | 12/2009 |
| WO | WO 2011/150369 A2 | 12/2011 |
| WO | WO 2012/027748 A2 | 3/2012 |

OTHER PUBLICATIONS

"LiveOnTheGo.com Launches Wireless Application for Quick Food Ordering from a Web-Enabled Mobile Phone or PDA," Business Wire: NA. Business Wire, Jan. 14, 2008.*
"GoMobo.com Selects MX Telecom's Messaging Gateway for Text Message Food Order and Payment Service," Business Wire: NA. Business Wire, Mar. 27, 2007.*
"Restaurants aim to boost sales with mobile apps," by Lisa Terry, Nation's Restaurant News, 43.8: 4(2) Lebhar-Friedman, Inc. (Mar. 2, 2009).*
Notification of Transmittal of the International Search Report and the Written Opinion of the International Searching Authority, or the Declaration for International Application No. PCT/US2011/038408 (Feb. 29, 2012).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).
Applicant-Initiated Interview Summary for U.S. Appl. No. 13/171,136 (Nov. 6, 2013).
Non-Final Office Action for U.S. Appl. No. 13/220,360 (Oct. 2, 2013).
Final Office Action for U.S. Appl. No. 13/118,046 (Oct. 2, 2013).
Advisory Action Before the Filing of an Appeal Brief for U.S. Appl. No. 13/171,136 (Sep. 11, 2013).
Final Office Action for U.S. Appl. No. 13/171,136 (Jun. 19, 2013).
Communication European Publication Number and Information on the Application of Article 67(3) EPC for European Patent Application No. 11820781.0 (Jun. 5, 2013).
Communication of European Publication Number and Information on the Application of Article 67(3) EPC for European Patent Application No. 11787521.1 (Mar. 13, 2013).
Non-Final Official Action for U.S. Appl. No. 13/118,046 (Oct. 3, 2012).
Non-Final Official Action for U.S. Appl. No. 13/171,136 (Sep. 25, 2012).
Notification of Transmittal of the International Search Report and the Written Opinion of the International Searching Authority, or the Declaration for International Application No. PCT/US2011/049572 (May 1, 2012).
Non-Final Office Action for U.S. Appl. No. 13/220,360 (Jun. 27, 2014).
Non-Final Office Action for U.S. Appl. No. 13/118,046 (Apr. 16, 2014).
Final Office Action for U.S. Appl. No. 13/220,360 (Mar. 3, 2014).
Extended European Search Report for European Application No. 11787521.1 (Feb. 28, 2014).
Extended European Search Report for European Application No. 11820781.0 (Feb. 27, 2014).
Applicant-Initiated Interview Summary for U.S. Appl. No. 13/220,360 (Sep. 10, 2015).
Applicant-Initiated Interview Summary for U.S. Appl. No. 13/171,136 (Sep. 3, 2015).
Communication pursuant to Article 94(3) EPC for European Application No. 11 787 521.1 (Jul. 15, 2015).
Final Office Action for U.S. Appl. No. 13/220,360 (Jun. 4, 2015).
Final Office Action for U.S. Appl. No. 13/171,136 (Jun. 3, 2015).
Applicant-Initiated Interview Summary for U.S. Appl. No. 13/220,360 (Mar. 26, 2015).
Final Office Action for U.S. Appl. No. 13/118,046 (Feb. 27, 2015).
Applicant-Initiated Interview Summary for U.S. Appl. No. 13/118,046 (Jan. 23, 2015).
Non-Final Office Action for U.S. Appl. No. 13/220,360 (Dec. 18, 2014).
Non-Final Office Action for U.S. Appl. No. 13/171,136 (Nov. 12, 2014).
Communication pursuant to Article 94(3) EPC for European Patent Application No. 11787521.1 (Oct. 27, 2014).
Non-Final Office Action for U.S. Appl. No. 13/118,046 (Sep. 25, 2014).
Interview Summary for U.S. Appl. No. 13/220,360 (Jul. 29, 2014).

(56) References Cited

OTHER PUBLICATIONS

Summons to Attend Oral Proceedinos pursuant to Rule 115(1) EPC for European Patent Application No. 11 787 521.1 (Jun. 29, 2016).
Final Office Action for U.S. Appl. No. 13/171,136 (Jun. 21, 2016).
Examiner initiated Interview Summary & Office Communication for U.S. Appl. No. 13/220,360, (May 19, 2016).
Notice of Allowance & Fee(s) Due for U.S. Appl. No. 13/220,360 (Apr. 28, 2016).
Examiner's Answer for U.S. Appl. No. 13/118,046 (Apr. 4, 2016).
Non-Final Office Action for U.S. Appl. No. 13/171,128 (Feb. 20, 2015).
Latif et al., "Automated Notification and Document Downloading in E-Learning—Development of an Agent-Based Framework Utilizing the Push-Pull Technology Interaction Policy", International Symposium on Information Technology, IEEE, pp. 1-7 (Aug. 2008).
Non-Final Office Action for U.S. Appl. No. 13/171,136 (Dec. 22, 2015).
Communication pursuant to Article 94(3) EPC for European Application No. 11 787 521.1 (Dec. 17, 2015).
Advisory Action for U.S. Appl. No. 13/220,360 (Oct. 1, 2015).
Communication pursuant to Article 94(3) EPC for European Application No. 11 820 781.0 (Sep. 17, 2015).
Appeal Board Decision for U.S. Appl. No. 13/118,046 (Sep. 14, 2016).
Advisory Action Before the Filing of an Appeal Brief for U.S. Appl. No. 13/171,136 (Sep. 14, 2016).
Commonly Assigned, Co-pending U.S. Appl. No. 15/250,697 for "Methods, Systems, and Computer Readable Media for Detecting Customer Presence to Initiate the Ordering and Purchase of Goods and Services," filed Aug. 29, 2016.

\* cited by examiner

METHODS, SYSTEMS, AND COMPUTER READABLE MEDIA FOR PREPARING AND DELIVERING AN ORDERED PRODUCT UPON DETECTING A CUSTOMER PRESENCE

PRIORITY CLAIM

The present application claims the benefit of U.S. Provisional Patent Application Ser. No. 61/384,013, filed Sep. 17, 2010, the disclosure of which is incorporated herein by reference in its entirety.

TECHNICAL FIELD

The subject matter described herein relates to the detection of wireless devices and processing wireless product orders. More particularly, the subject matter described herein relates to methods, systems, and computer readable media for preparing and delivering an ordered product upon detecting a customer presence.

BACKGROUND

At present, a customer can place an order for goods and/or services using an online transaction or phone call where the goods and/or services may be subsequently picked up or obtained at a merchant location. However, when the customer arrives at a designated location and picks up the ordered product (e.g., such as an order for food from a specific restaurant), the customer has to verbally identify himself by conversing with a salesperson to give a name, credit card number, order number, or some other identification information. In other instances, the customer must be physically present at the location where the order was placed and listen for his name to be called to receive delivery of the ordered good. In both of these types of scenarios, interaction with a salesperson is required and can prove to be a time consuming process. Specifically, the process most often requires waiting and/or standing in a line to communicate with the salesperson.

Accordingly, there exists a need for methods, systems, and computer readable media for preparing and delivering an ordered product upon detecting a customer presence.

SUMMARY

According to one aspect, the subject matter described herein includes methods, systems, and computer readable media for preparing and delivering an ordered product upon detecting a customer presence. In one embodiment, a method includes detecting the presence of a mobile device associated with a customer identifier at a designated area and initiating, upon detecting the presence of the mobile device, the processing of a stored order request associated with the customer identifier for at least one product. The method further includes utilizing the customer identifier to send a notification message to the mobile device indicating that the at least one product is available for pickup or delivery.

As used herein, the terms "wireless smart device" and "NFC enabled device" may be synonymous and are intended to refer to any device enabled with near field communication (NFC), radio frequency (RF) communication, or barcode capturing capabilities to interact with an NFC smart poster, a wireless device reader, or a wireless device writer with the corresponding technology. In one aspect, wireless device reader and/or writer may include a radio frequency (RF) reader and/or writer. One type of wireless device that can wirelessly communicate to a wireless smart device reader is an NFC card or NFC handheld device, including but not limited to a smart phone. In near field communication, a wireless smart device may communicate with a wireless transceiver or wireless device reader via inductive coupling of the reader antenna to the device antenna. The two loop antennas effectively form a transformer. The reader amplitude-modulates the radio frequency (RF) field to send information to the device. The device communicates with the transceiver and/or reader by modulating the loading on the device antenna, which also modulates the load on the reader antenna. In a wireless smart device, the NFC handset may enable contactless payment, and a security element (SE) for ensuring secure transactions may be embedded, provided by a universal subscriber identity module (USIM), or provided as an add-on to, for example, a SD or a jacket. Wireless smart devices may communicate with a transceiver or wireless device reader using NFC. As used herein, the term "wireless communication" includes communication conducted at ISO 14443 and ISO 18092 interfaces. These specifications define communication protocols for wireless smart devices operating in close proximity with a reader antenna.

The subject matter described herein may be implemented in software in combination with hardware or in software in combination with hardware and firmware. For example, the subject matter described herein may be implemented in software executed by a hardware based processor. In one exemplary implementation, the subject matter described herein for preparing and delivering an ordered product upon detecting a customer presence may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
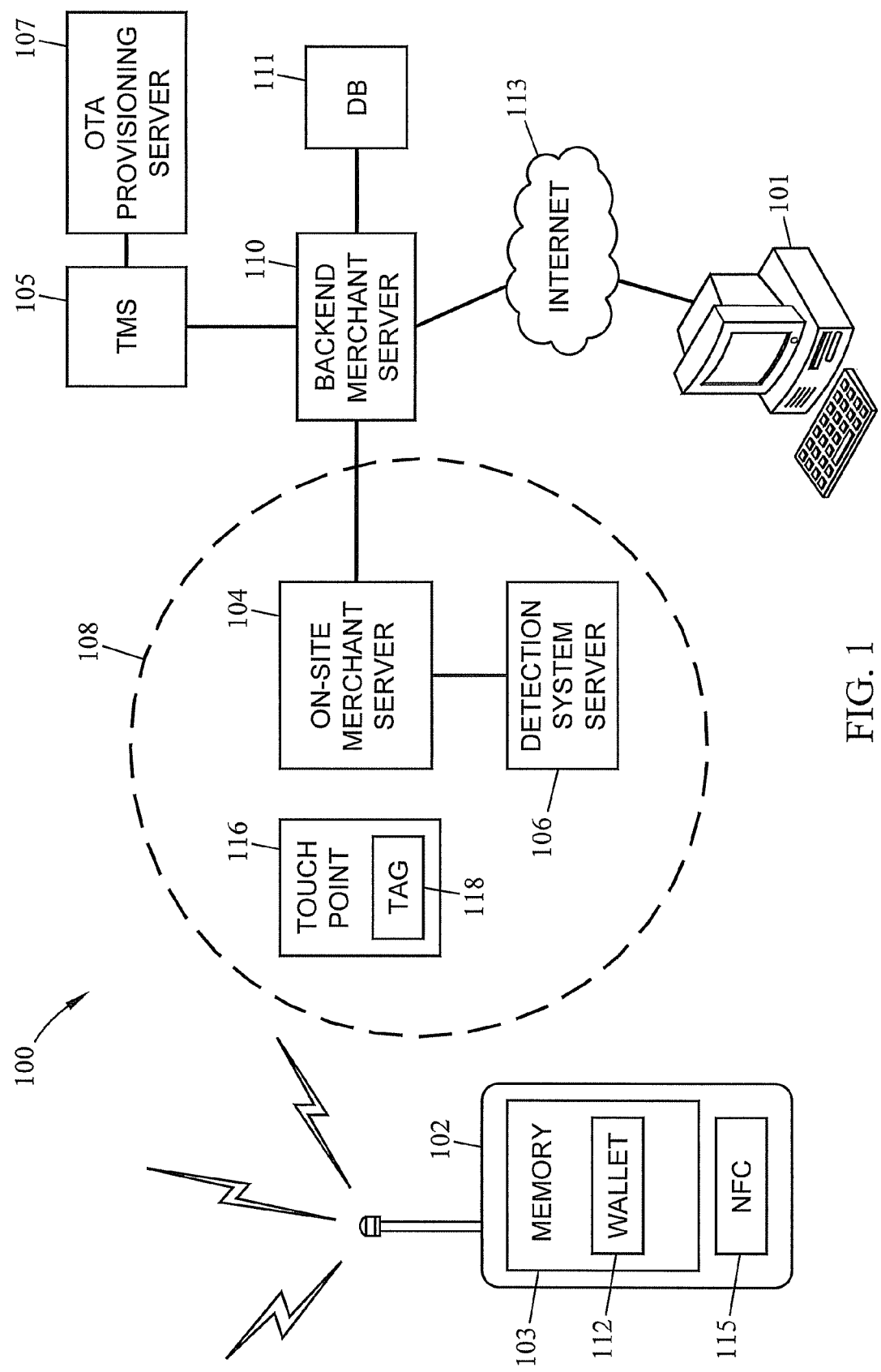
FIG. 1 is a block diagram illustrating an exemplary system for preparing and delivering an ordered product upon detecting a customer presence according to an embodiment of the subject matter described herein.

FIG. 1 is a schematic diagram illustrating an exemplary system 100 for preparing and delivering an ordered product upon detecting a customer presence according to an embodiment described herein. Referring to FIG. 1, exemplary system 100 includes a client device 101 (e.g., a personal computer), a mobile device 102 (e.g., a wireless smart device), a touch point 116, an on-site merchant server 104, a detection system server 106, a backend merchant server 110 and associated database 111, a trigger management server (TMS) 105, and an over the air (OTA) provisioning server 107.

In one embodiment, mobile device 102 is a near field communications (NFC) enabled mobile device or smart phone. Mobile device 102 may include any smart phone device that is configured to wirelessly communicate via NFC. In one embodiment, mobile device 102 may include a hardware based NFC module 115 that enables mobile device 102 to send and receive NFC signals. Mobile device 102 may also include a wallet application 112 that is used to facilitate secure payment and non-payment transactions via NFC. In one embodiment, wallet application 112 includes a software application that resides in a memory 103 or a hardware storage component in mobile device 102 and may be executed by a hardware processor (not shown) in mobile device 102. Wallet application 112 may be configured to manage, select and utilize various software based electronic certificates or "softcards" used to conduct the NFC payment and/or non-payment transactions. Exemplary softcards include payment and non-payment electronic certificates, such as, electronic credit cards, electronic loyalty cards, electronic tickets, electronic debit cards, electronic loyalty reward certificates, electronic coupons, electronic gift cards, electronic prepaid cards, and the like. In one embodiment, memory 103 may comprise at least one of a secure memory element and/or a non-secure baseband memory.

Touch point 116 may include any object capable of being interfaced with an NFC enabled mobile device and is located in a place that is readily accessible by potential customers of goods and/or services. Exemplary touch points include an NFC smart poster, a barcode chart, QR code, an NFC wireless reader and/or writing device, a radio frequency (RF) device reader/writer, a passive RF tag, and the like. Touch point 116 may be located inside and/or near a merchant establishment. Although FIG. 1 only depicts a touch point 116 generally positioned within a designated area 108 associated with a merchant location, a touch point may be located at a store/restaurant entrance, a designated pickup area, a parking spot, a dining room table, and the like without departing from the scope of the present subject matter. For example, touch point 116 may be located inside a restaurant establishment (such as STARBUCKS® or MCDONALD'S®), at a store entrance, on a store wall, at a pickup area, at a dining table, or other easily accessible location in or near the store that may serve as a delivery point. In another embodiment, a touch point 116 may be located adjacent to an associated parking area or parking spot near a merchant establishment.

Notably, a customer may utilize touch point 116 to notify a merchant or retailer entity of his presence at a designated location by interfacing mobile device 102 via NFC (e.g., an NFC tap) with touch point 116 in order to allow for convenient product order preparation and delivery, there allowing the customer the option to bypass a cashier line. In one embodiment, NFC module 115 and may be utilized by mobile device 102 to interface with touch point 116 using near field communications.

The present subject matter involves the storing of a pre-placed or pre-configured order for at least one product associated with a merchant entity, detecting the presence or arrival of the customer at a location associated with the merchant entity, triggering the preparation and/or delivery of the at least one product, and sending a notification to the customer that the at least one product is available for pickup or delivery. In one embodiment, a customer may use a client device (e.g., personal computer 101 or mobile device 102) to place an order for a good or service with a merchant entity. For example, a customer may place an order with a backend merchant server 110 for a specific fast food combination meal with a fast food restaurant using a personal computer 101 connected to internet network 113. Similarly, the order may be placed using mobile device 102 which utilizes a web browser application to wirelessly (E.g., via WiFi or cellular communications) to place an order with backend merchant server 110. In one embodiment, the order may be placed by mobile device 102 via communicating order and payment information to TMS 105 when mobile device 102 is used to select menu or product items from an NFC smart poster.

The order (i.e., order request data) may include a product identifier that identifies the requested product, a customer identifier, and/or payment credential data (e.g., a credit card number) that can be used to facilitate the purchase of the ordered product. In one embodiment, the customer identifier may include any identifier associated with or that identifies the customer, such as a loyalty number, a mobile device number, a credit card number, or an order identifier. In one embodiment, the payment credential data may be managed by a wallet application 112 in mobile device 102. For example, wallet application 112 may utilize and manage multiple payment transaction softcards stored on the mobile device, such as electronic credit cards, electronic debit cards, electronic prepaid cards, electronic loyalty reward certificates, electronic coupons, electronic gift cards, and the like. The order request data for at least one product may be provided by the customer (e.g., originating from PC 101 or mobile device 102) to a backend merchant server 110 associated with the merchant entity. For example, a customer may place an order for at least one product using a web browser and personal computer 101. Similarly, a customer may place the order for the product(s) using a web browser and/or an application ("app") on mobile device 102. In an alternate embodiment, only the customer identifier associated with the order of the desired product is stored on backend merchant server 110, while the product identifier and payment credential information is securely stored in mobile device 102 (which may be requested later upon customer detection).

In one embodiment, after backend merchant server 110 receives the order request data (or just the customer identifier), a customer's presence and mobile device 102 may be detected. In one embodiment, the customer's presence and/or arrival to the merchant location may be detected upon mobile device 102 interfacing (via NFC) with a touch point 116, such as a smart poster or wireless device reader/writer at, for example, a store entrance, a dining table, or parking spot. Alternatively, the customer's presence and mobile device 102 may automatically be detected at the merchant location by detection system server 106 when mobile device 102 enters a designated area 108 associated with a merchant entity. Both of these embodiments may utilize a wallet application 112 stored in mobile device 102. In one embodiment, wallet application 112 may include a software application or module (e.g., a MIDlet application) that is stored in memory 103 (either in a secure memory element and/or non-secure baseband memory) of mobile device 102, and when executed by a hardware based processor in mobile device 102 is capable of performing various functionalities. Wallet application 112 may be used to communicate information to TMS 105 and receive provisioned data from OTA provisioning server 107. Payment credential data, such as electronic payment softcards including credit or debit cards may also be stored in any suitable user defined priority within wallet application 112. Alternatively, wallet application 112 may be programmed to use certain electronic payment softcards under certain conditions. For example, wallet application 112 may be programmed to conduct a purchase transaction using a MACY'S® softcard (e.g., an electronic software based card stored and displayed via device 102) when in a MACY'S® store. GPS triangulation, GSM triangulation, or WiFi triangulation methods applied to mobile device 102 could be used to determine when mobile device 102 is present in a certain location, such as a MACY'S® store (e.g., when device 102 is interfaces with a wireless reader in MACY'S®). User preferences can be used to prioritize electronic softcards residing within wallet application 112.

As mentioned above, mobile device 102 may be detected when the user interfaces mobile device 102 (e.g., taps) with touch point 116, which may include a smart tag 118 that comprises a passive NFC or RF tag device (e.g., a circuit device or wireless transceiver) that is powered by an interfacing mobile device 102. For example, after mobile device 102 is tapped or brought in close proximity with smart tag 118, smart tag 118 may be activated by obtaining power from the electromagnetic field generated by mobile device 102. In other embodiments, smart tag 118 may include an active RF tag or reader equipped with its own power source (e.g., a battery). Whether passive or active, smart tag 118 is capable of communicating smart poster content information to an interfacing mobile device 102. In one embodiment, the smart tag content information may include, a merchant entity code (MEC), a tag location code (TLC), and/or a location identifier (e.g., an IP address, a URL, a URI, and the like) associated with TMS 105, all of which may be provided to a mobile device 102 via NFC. In an alternate embodiment, the location identifier may be associated with a backend merchant server 110 (thereby, communication of order request data may occur directly between mobile device 102 and backend merchant server 110).

In one embodiment, mobile device 102 may initiate wallet application 112 upon interfacing with smart tag 118 on touch point 116. In such an embodiment, a customer may sit down at a table in a restaurant and tap mobile device 102 to touch point 116 and wirelessly receive information including a location identifier (e.g., URL, IP address, or URI) associated with TMS 105, an MEC (which identifies a specific merchant and/or backend merchant server) and a TLC, which corresponds to a specific location of the touch point (e.g., a table identifier). In one embodiment, a consumer may trigger wallet application 112 to download a TLC and an associated MEC (which, e.g., identifies the merchant entity) by interfacing mobile device 102 with at least one smart tag 118 on touch point 116.

In one embodiment, wallet application 112 may use a location identifier (e.g., a URL, URI, or IP address) provided by touch point 116 to communicate with trigger management server 105 or backend merchant server 110 in order to inform a merchant entity of the customer's presence and/or arrival at a merchant location (e.g., a store, a fast food restaurant, café, and the like). For example, a wallet application 112 may be configured to contact a trigger management server 105 using the location identifier and provide TMS 105 with a MEC. TMS 105 may use the MEC to determine the appropriate merchant entity and corresponding merchant server associated with the order (e.g., by accessing a database of merchant identities mapped to merchant server addresses). Once an appropriate merchant server (e.g., merchant server 116) is determined, TMS 105 may forward the MEC along with the customer identifier to backend merchant server 110. Using the customer identifier, server 110 may access and extract the previously stored order request data from a database 111. In one embodiment, database 111 may include entries that map the stored order request data (e.g., product identifier, payment credentials, and the like) with the customer identifier. Server 110 may cross-reference the customer identifier provided in response to the detection of mobile device 102 with the stored customer identifiers in database 111, thereby accessing the appropriate stored order request data when a match of customer identifiers is made. Upon finding the stored order request data corresponding to the customer identifier associated with mobile device 102, server 110 may process the payment credential data and provide the product identifier and customer identifier to on-site merchant server 104. Notably, server 110 may identify an appropriate on-site merchant server 104 using the MEC. Upon receiving the desired data, on-site merchant server 104 then provides the order data along with a customer phone number (e.g., customer identifier) to OTA provisioning server 107, which may then send a notification message (e.g., a text or email message) to be displayed by mobile device 102 for the customer. The notification message may either indicate the ordered product is available for pickup at a designated location or that the product is being delivered to a location associated with the TLC corresponding to the touch point 116 interfaced by mobile device 102.

By preparing the order for the product upon detection, a customer is enabled to pre-order hot food or beverages (e.g., a coffee) that may be prepared immediately upon the customer's arrival at a merchant or restaurant location without the potential for the food/beverage becoming cold. Also, by preparing the order for the product upon detection, the customer may also receive the product without having to wait in line or without speaking to a salesperson/cashier.

In one embodiment, an order identifier, payment credential information and a customer identifier (e.g., mobile phone number) may be wirelessly communicated to backend merchant server 110 (via TMS 105) to initiate a purchase transaction. In one embodiment, wallet 112 sends at least the product identifier, a customer identifier (e.g., the mobile device phone number), and payment credential data to backend merchant server 110. Backend merchant server 110 is then responsible for communicating the payment credential data to payment servers associated with issuing banks or credit providers (not shown) to properly conduct proper payment procedures. After a successful transfer of funds and/or credit, backend merchant server 110 may communicate a message indicating a successful purchase transaction to TMS 105, which in turn notifies mobile device 102 via OTA provisioning server 107. Backend merchant server 110 may also inform on-site merchant server 104 (e.g., sending an electronic message) that the purchase transaction of the ordered product was successfully conducted and that the order should be filled.

In one embodiment, mobile device 102 may be detected when mobile device 102 is brought within a designated area 108 associated with a merchant location. In such embodiments, a customer associated with mobile device 102 may register with the merchant entity and provide a registered/recognizable customer identifier associated with mobile device 102 such that a detection system server 106 may be permitted to wirelessly detect mobile device 102 entering or activated within designated area 108. In an alternate embodiment, a hardware component (e.g., a hardware circuit) may be added to mobile device 102 to enable detection by system 106.

For example, designated area 108 may be associated with a store location, a parking spot location, a parking lot location, and the like. Designated area 108 may be defined and monitored by a detection system server 106 that utilizes WiFi-based, global systems for mobile communications (GSM)-based, BLUETOOTH®-based (e.g., BLUETOOTH® handshaking), cellular-based, and/or global positioning system (GPS) based technologies. For example, detection system server 106 may include a WiFi based router associated with a merchant entity that detects the presence of a consumer's mobile device 102 within a WiFi range, e.g., designated area 108. In one embodiment, mobile device 102 may utilize a service set identifier (SSID) associated with detection system server 106 and provide an identifier associated with mobile device 102 that has been registered and is recognized by detection system server 106. In another embodiment, WiFi, cellular and or GPS positioning solutions using triangulation may be employed to detect mobile device 102. For example, detection system server 106 may utilize a plurality of routers that, upon communicating with mobile device 102 (e.g., upon receiving one or more customer presence signals that include an SSID and recognizable mobile device identifier), may determine the position of mobile device 102 and may generate an alert to an on-site merchant server 104 that mobile device 102 has entered or been activated in a designated area (e.g., utilizing coordinates to define boundaries of a store, a parking lot, or a specific parking spot).

Once identified/detected in a parking lot or in a store/restaurant, detection system server 106 may communicate directly with backend merchant server 110 directly or via on-site merchant server 104 and/or TMS 105. For example, detection system server 106 may provide a customer identifier, a MEC, and location information associated with mobile device 102 to TMS 105. TMS 105 may then use the merchant identifier to communicate with backend merchant server 110, which in turn utilizes the customer identifier to determine if an order associated with the customer identifier has been previously stored (either via a website or mobile device) with backend merchant server 110 or in wallet application 112.

Upon determining that an order has been previously stored, backend merchant server 110 may access and begin processing the pre-made or pre-configured order. After utilizing the payment credential data, backend merchant server 110 notifies on-site merchant server 104 to prepare the product identified by the product identifier. Once on-site merchant server 104 receives the notification, employees at the related merchant location prepare the desired product (e.g., food or beverage). Upon completing the preparation of the desired product, the merchant entity may send a notification message to the customer's mobile device either directly or via OTA provisioning server 107. The notification message may indicate that the product is available to be picked up at a designated location (e.g., a drive-thru window or a designated counter) or that the product is available and is in the process of being delivered to a designated location (e.g., a parking spot or a dining room table). A product may be delivered to the customer if the mobile device obtained and subsequently provided a TLC to TMS 105 (or server 110) upon the initial interfacing of mobile device 102 with touch point 116. If the customer was automatically detected by detection system server 106, then the customer may subsequently interface mobile device 102 with a touch point (e.g., parking spot, dining table, etc.) and provide an associated TLC to server 104 or TMS 105.

In one embodiment, OTA provisioning server 107 may notify mobile device using an over the internet (OTI) server path/channel to mobile device 102 since the notification message comprises low security data. Notably, the OTI channel allows for faster communication with low security overhead. In an alternate embodiment, backend merchant server 110 and/or TMS 105 may directly communicate a message to mobile device 102 via a WiFi channel.

In one embodiment, the user may also save an order within memory 103 (e.g., wallet application 112) for future reordering purposes. This is advantageous as orders can be reused without having to be recreated or reselected. In this embodiment, the customer may use NFC enabled device 102 to specify choices from various menu item choices, sizes, and details of the product using wallet application 112. The customer may also store the predefined order with an associated payment credential. This feature also simplifies the ordering process thereby saving consumers time. The predefined order can then be saved to NFC enabled device 102. Notably, the saved order may be triggered to be processed upon mobile device 102 being detected by detection system server 106 (e.g., entering or activated within designated area 108 and/or via detection by WiFi triangulation). Alternatively, the access and processing of a pre-stored order in mobile device 102 may be triggered upon tapping (e.g., NFC interfacing with) touch point 116 or tapping on an RF device reader/writer at the point of sale. Also, a pre-stored order in mobile device 102 may be triggered via a touch point that may be installed at a dining table, pick up area, or any other location in the restaurant or store.

Figure 2:
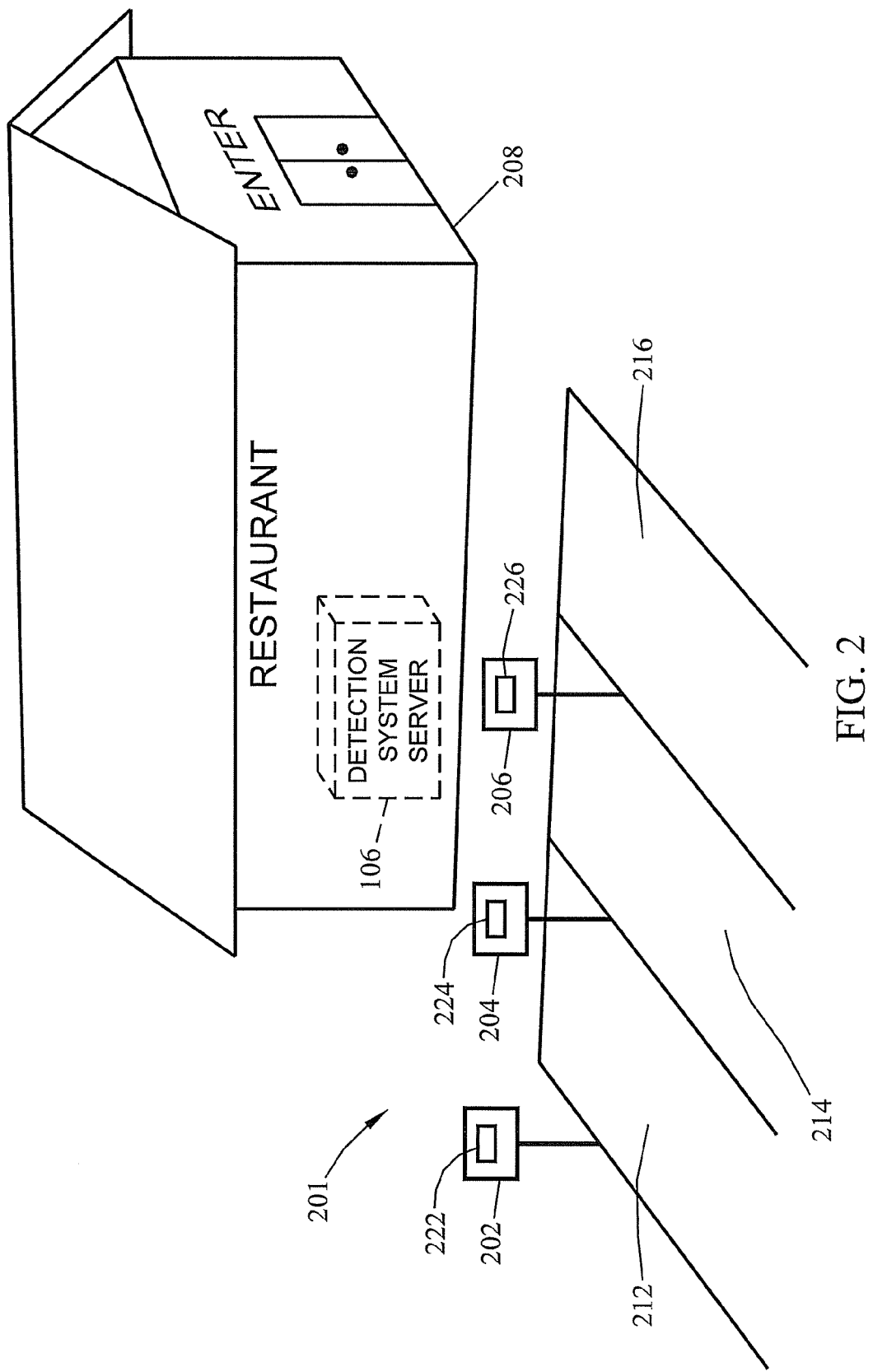
FIG. 2 is a diagram illustrating the detection of consumer presence in a parking lot and the initiation of the preparation and delivery of goods according to an embodiment of the subject matter described herein.

FIG. 2 depicts an exemplary embodiment in which a customer's arrival or presence is detected in a parking lot and the initiation of preparing and delivering of goods according to an embodiment of the subject matter described herein. In one embodiment, a merchant location such as restaurant 208 may be located near a parking lot area with a plurality of parking spaces 212-216. Each of parking spaces 212-216 may be equipped with its own parking spot touch point 202-206. Each of parking space touch points 202-206 may be equipped with at least one smart tag 222-226.

In one embodiment, a mobile device 102 is carried into or turned on in a designated service area (not unlike area 108 depicted in FIG. 1). A detection system server 106 in restaurant 208 may be used to monitor and define a designated area 108 by utilizing the range of WiFi-based, GSM-based, BLUETOOTH®-based, cellular-based, and/or global positioning system (GPS) based technologies. For example, detection system server 106 may include a WiFi based router associated with a merchant entity may detect the presence of a consumer's mobile device 102 within a WiFi range, e.g., area surrounding restaurant 208 or the area defined by parking lot 201.

In one embodiment, mobile device 102 may utilize a service set identifier (SSID) associated with detection system server 106 and provide a mobile device or customer identifier that is recognized by detection system server 106 (e.g., via prior registration). In another embodiment, detection system server 106 may utilize WiFi triangulation, cellular triangulation and or GPS triangulation solutions to detect mobile device 102. For example, detection system server 106 may utilize a plurality of WiFi routers that upon communication with (e.g., upon exchanging WiFi signals that include an SSID and recognizable mobile device identifier) mobile device 102, may determine the geographical position of mobile device 102. If mobile device 102 enters the restaurant 208 or is located in a particular parking lot, detection system server 106 may generate an alert message to on-site merchant server 104 (not shown in FIG. 2) to indicate the arrival/presence of mobile device 102. For example, certain WiFi or GPS coordinates may be predefined to correspond with a particular parking space, parking lot, or the entrance of restaurant 208. In one embodiment, a user of mobile device 102 may utilize an application to initiate communication (i.e., initiate the detection process) with detection system 106 after parking in any of parking spaces 212-216. After mobile device 102 is identified/detected in a parking space or at the store/restaurant entrance, on-site merchant server may communicate directly with TMS 105 in the manner described above.

In an alternate embodiment, a customer may park an automobile in any one of parking spaces 212-216 and, from the automobile, use a mobile device 102 to interface (i.e., NFC tap) with a respective parking space touch point 202-206. For example, if a customer parked in parking space 212, the customer may view the parking space touch point 202 to notify the merchant entity of his presence. The user may interface mobile device 102 with smart tag 222. However, in this embodiment, the tag location code may specifically identify a parking spot 212. The location of dining tables in restaurant 208 may be identified in a similar manner.

Figure 3:
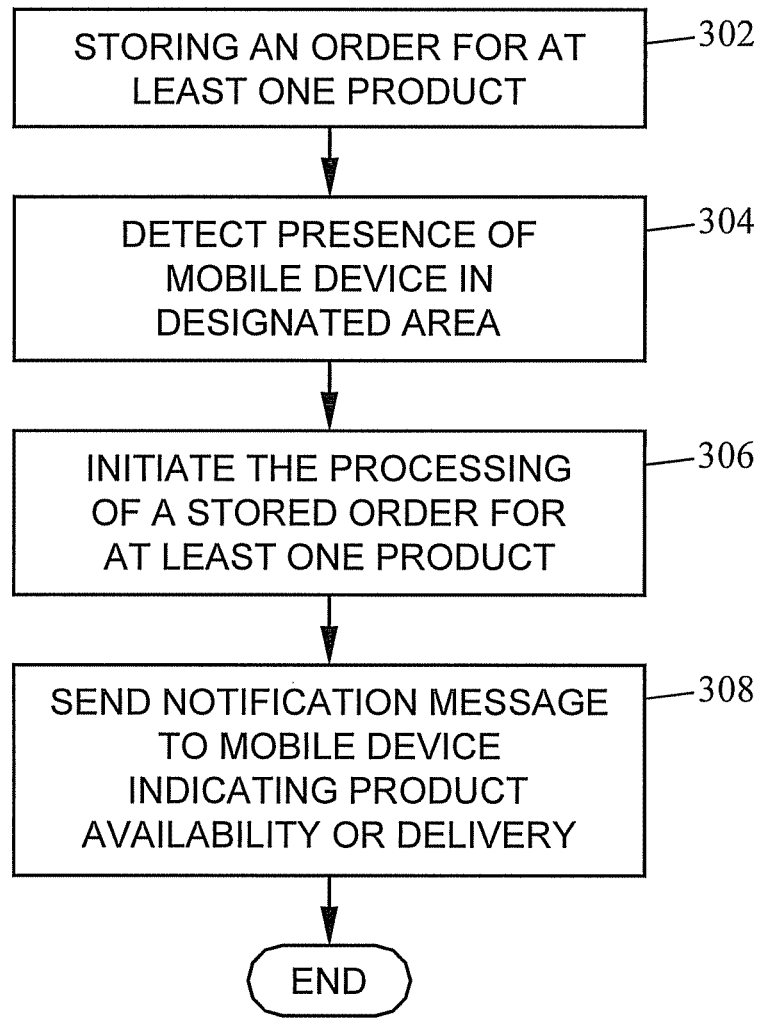
FIG. 3 is a flow chart illustrating an exemplary process for preparing and delivering an ordered product upon detecting a customer presence according to an embodiment of the subject matter described herein.

FIG. 3 is a flow chart illustrating an exemplary process 300 for detecting customer presence to initiate the preparation and delivery of goods according to an embodiment of the subject matter described herein.

In block 302, an order request for at least one product is stored. In one embodiment, a customer utilizes a client device (e.g., mobile device 102 or personal computer 101) to place an order with a merchant entity. For example, a customer may place an online order for a specific fast food combination meal with a fast food restaurant. Purchase order data may be transmitted to a backend merchant server 110 associated with the fast food restaurant where the order is stored. In one embodiment, the stored purchase order data may include payment credential data, a product identifier, and a customer identifier (e.g., a mobile phone number, a loyalty number, an order number, a credit card number, etc.). In an alternate embodiment, only the customer identifier is stored on backend merchant server 110, while the order identifier and payment information is securely stored in mobile device 102 and subsequently provided to the merchant upon pickup or delivery of the product.

In block 304, the presence of the customer's mobile device is detected. In one embodiment, a detection system server 106 (as shown in FIG. 1) at a merchant location detects the presence of the customer's mobile device. For example, mobile device 102 may be carried into or turned on in designated area 108, which is associated with the merchant location (e.g., the aforementioned fast food restaurant). Designated area 108 may be a WiFi service area that is created by a range-based WiFi detection system server 106 at the merchant location. In one embodiment, the designated area 108 is defined by the range of a WiFi router. For example, the designated area may include the merchant location and/or a store parking lot (or at least a portion thereof) that is contained within the range of a WiFi router. In an alternate embodiment, detection system server 106 may utilize a plurality of routers to detect the presence of the mobile device via WiFi triangulation. In yet another embodiment, cellular (e.g., GSM) triangulation and/or GPS triangulation solutions may be employed to detect the presence of a registered mobile device. Notably, detection system server 106 is configured to recognize a consumer's mobile device presence in a designated area (e.g., a store entrance or a parking lot space). In yet another embodiment, mobile device 102 may be may be interfaced with or tapped on a touch point in merchant store 204 or other area (e.g., a smart poster located at a parking space).

In block 306, the processing of the stored order request for the at least one product is initiated. In one embodiment, detection system server 106 informs backend merchant server 110 via on-site merchant server 104 that mobile device 102 was detected in designated area 108 via a WiFi router or via a triangulation technology (e.g., via WiFi, GPS, or cellular triangulation). For example, detection system server 106 may provide a customer identifier associated with detected mobile device 102 to backend server 110. Upon detecting mobile device 102, server 106 may communicate a customer identifier to merchant server 110 (either directly or via TMS 105 or merchant server 104). Merchant server 110 may then identify the appropriate stored order for the at least one product by accessing a database 111 that maps stored order request data to customer identifiers. Merchant server 110 may utilize payment credential information included in the stored order request data to conduct a purchase transaction on the backend. Upon conducting the payment transaction, merchant server 110 may inform on-site merchant server 104 of the approved payment transaction. In response, employees at the merchant location associated with server 104 may then prepare and fulfill the order for the at least one product.

In block 308, a notification message indicating that the product is available for pickup or delivery is sent. For example, when the product is available to be picked up and/or ready to be delivered by the merchant entity, on-site merchant server 104 associated with the store location (e.g., restaurant, fast food restaurant, retail store, or merchant entity) may send a notification message (e.g., SMS/MMS or email) to the customer's mobile phone 102 that the purchased product (e.g., food item, beverage item, combo meal, groceries, general merchandize, etc.) is ready to be picked up from the merchant location (e.g., inside the store or a drive-thru window, or a designated parking space). Alternatively, the notification message sent to the consumer's mobile device 102 may indicate that the product is available and will be delivered to the specific parking spot or table indicated by the associated location identifier (which may have been provided to the server 104 or server 110 upon mobile device 102 interfacing with touch point 116). In one embodiment, the customer identifier is utilized to send the notification message to mobile device 102. In one embodiment, the notification message is wirelessly sent to mobile device by backend merchant server 110 via OTA provisioning server 107 or via Internet 113.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for detecting customer presence to initiate ordering and purchase of goods and services, the system comprising:

a detection system server configured to receive a customer presence signal communicated by a mobile device that includes both a customer identifier and a service set identifier (SSID) associated with the detection system server upon the mobile device entering or being activated within a designated area, wherein the designated area includes a range associated with the detection system server, and to detect a presence of the mobile device associated with the customer identifier in the designated area by receiving the customer presence signal communicated by the mobile device, wherein the customer identifier in the customer presence signal is recognized by the detection system server due to a prior registration of the customer identifier;

a trigger management server (TMS) configured to receive the customer identifier and a merchant entity code (MEC) from the detection system server, to determine a merchant server identified by the MEC, and to utilize the MEC to subsequently provide the customer identifier to the merchant server via a detection notification message that indicates the presence of the mobile device;

the merchant server configured to receive the detection notification message indicating the presence of the mobile device, wherein the detection notification message includes the customer identifier, to initiate processing of stored order request data associated with the customer identifier for at least one product, and to utilize the customer identifier to send a notification message to the mobile device indicating that the at least one product is available for pickup or delivery, wherein the stored order request data includes payment credential data associated with an electronic payment softcard that is previously provided to the merchant server by the mobile device prior to the detection system server receiving the customer presence signal communicated by the mobile device; and wherein the detection system server and the merchant server comprise a computing platform including a hardware based processor.

2. The system of claim 1 wherein the stored order request data is stored in the memory of the mobile device.

3. The system of claim 1 wherein the stored order request data is stored in the merchant server.

4. The system of claim 1 wherein the merchant server is further configured to receive the stored order request data for the at least one product from a client device, wherein the stored order request data includes the payment credential data, an order identifier corresponding to the at least one product, and the customer identifier.

5. The system of claim 1 wherein the merchant server is further configured to receive, from the mobile device, a tag location code (TLC) associated with a touch point that is located in the designated area and is interfaced with the mobile device.

6. The system of claim 5 wherein the touch point includes at least one of a near field communication (NFC) smart poster, a radio frequency (RF) reader, and a barcode chart, the designated area is at least one of a parking spot and a dining table, and the TLC identifies at least one of the parking spot and the dining table.

7. The system of claim 1 wherein the merchant server is configured to use a tag location code (TLC) associated with the mobile device to direct the delivery of the at least one product to a designated location.

8. The system of claim 1 wherein the detection system server is further configured to detect the mobile device using at least one of: a global system of mobile communications (GSM) triangulation and a global positioning system (GPS) triangulation.

9. The system of claim 1 wherein the at least one product is delivered to a customer associated with the mobile device at a designated location.

10. The system of claim 1 wherein the notification message indicates a pickup location for the available at least one product.

11. A method for detecting customer presence to initiate delivery of a product, the method comprising:

receiving, by a detection system server, a customer presence signal communicated by a mobile device that includes both a customer identifier and a service set identifier (SSID) associated with the detection system server upon the mobile device entering or being activated within a designated area, wherein the designated area includes a range associated with the detection system server;

detecting, by the detection system server, a presence of the mobile device associated with the customer identifier at the designated area by receiving the customer presence signal communicated by the mobile device, wherein the customer identifier in the customer presence signal is recognized by the detection system server due to a prior registration of the customer identifier;

receiving, by a trigger management server (TMS) from the detection system server, the customer identifier and a merchant entity code (MEC) that is used to determine a merchant server identified by the MEC;

utilizing, by the TMS, the MEC to provide the customer identifier to the merchant server via a detection notification message that indicates the presence of the mobile device;

receiving, by the merchant server, the detection notification message indicating the detected presence of the mobile device, wherein the detection notification message includes the customer identifier;

initiating, by the merchant server, upon being informed by the detection system server of the detected presence of the mobile device, processing of stored order request data associated with the customer identifier for at least one product, wherein the stored order request data includes payment credential data associated with an electronic payment softcard that is previously provided to the merchant server by the mobile device prior to the detection system server receiving the customer presence signal communicated by the mobile device;

utilizing the customer identifier to send a notification message to the mobile device indicating that the at least one product is available for pickup or delivery; and wherein each of the detection system server and the merchant server comprises a computing platform including a hardware based processor.

12. The method of claim 11 comprising storing the stored order request data for the at least one product in the memory of the mobile device.

13. The method of claim 11 comprising storing the stored order request data for the at least one product in a backend merchant server.

14. The method of claim 11 comprising: receiving the stored order request data for the at least one product from a client device, wherein the stored order request data includes the payment credential data, an order identifier corresponding to the at least one product, and the customer identifier.

15. The method of claim 11 comprising receiving, from the mobile device, a tag location code (TLC) associated with a touch point that is located in the designated area and is interfaced with the mobile device.

16. The method of claim 15 wherein the touch point includes at least one of a near field communication (NFC) smart poster, a radio frequency (RF) reader, and a barcode chart, the designated area is at least one of a parking spot and a dining table, and the TLC identifies at least one of the parking spot and the dining table.

17. The method of claim 11 comprising using a location code (TLC) associated with the mobile device to deliver the at least one product to a designated location.

18. The method of claim 11 wherein detecting the presence of a mobile device includes detecting the mobile device using at least one of: a global system of mobile communications (GSM) triangulation and a global positioning system (GPS) triangulation.

19. The method of claim 11 comprising delivering the at least one product to a customer associated with the mobile device at a designated location.

20. The method of claim 11 wherein the notification message indicates a pickup location for the available at least one product.

21. A non-transitory computer readable medium having stored thereon computer executable instructions that when executed by at least one processor of at least one computer performs steps comprising:

receiving, by a detection system server, a customer presence signal communicated by a mobile device that includes both a customer identifier and a service set identifier (SSID) associated with the detection system server upon the mobile device entering or being activated within a designated area, wherein the designated area includes a range associated with the detection system server;

detecting, by the detection system server, a presence of the mobile device associated with the customer identifier at the designated area by receiving the customer presence signal communicated by the mobile device wherein the customer identifier in the customer presence signal is recognized by the detection system server due to a prior registration of the customer identifier;

receiving, by a trigger management server (TMS) from the detection system server, the customer identifier and a merchant entity code (MEC) that is used to determine a merchant server identified by the MEC;

utilizing, by the TMS, the MEC to provide the customer identifier to the merchant server via a detection notification message that indicates the presence of the mobile device;

receiving, by the merchant server, the detection notification message indicating the detected presence of the mobile device, wherein the detection notification message includes the customer identifier;

initiating, by the merchant server, upon detecting the presence of the mobile device, processing of stored order request data associated with the customer identifier for at least one product, wherein the stored order request data includes payment credential data associated with an electronic payment softcard that is previously provided to the merchant server by the mobile device prior to the detection system server receiving the customer presence signal communicated by the mobile device; and utilizing the customer identifier to send a notification message to the mobile device indicating that the at least one product is available for pickup or delivery.

* * * * *